United States Patent [19]
Zimble

[11] Patent Number: 4,742,631
[45] Date of Patent: May 10, 1988

[54] TRANSPARENCY MOUNTING DEVICE AND METHOD

[76] Inventor: Alan W. Zimble, c/o Connolly and Hutz, 1220 Market St., P.O. Box 2207, Wilmington, Del. 19899-2207

[21] Appl. No.: 733,637

[22] Filed: May 13, 1985

[51] Int. Cl.⁴ .............................................. G09F 1/00
[52] U.S. Cl. ................................ 40/158 B; 40/594; 40/615
[58] Field of Search ............... 40/158 B, 158 R, 564, 40/594, 15 B, 615

[56] References Cited

U.S. PATENT DOCUMENTS

| | | | |
|---|---|---|---|
| 140,245 | 6/1873 | Clemens | 40/158 R |
| 2,842,882 | 7/1958 | Greene et al. | 40/158 B |
| 2,896,351 | 7/1959 | Johnson | 40/158 B |
| 2,936,540 | 5/1960 | Power | 40/158 B |
| 3,024,553 | 3/1962 | Rowley | 40/158 R |
| 3,283,434 | 11/1966 | Gurin et al. | 40/158 R |
| 3,304,641 | 2/1967 | Gonczy | 40/158 R |
| 3,386,199 | 6/1968 | Nagatsuka | 40/158 R |
| 3,581,423 | 6/1971 | Mascolo | 40/158 R |
| 3,822,495 | 7/1974 | Ofuji | 40/158 R |
| 3,956,054 | 5/1976 | Griswold et al. | 40/158 B |
| 4,316,337 | 2/1982 | Da Costa | 40/564 |
| 4,333,254 | 6/1982 | Stevenson | 40/158 B |

Primary Examiner—Gene Mancene
Assistant Examiner—Wenceslao J. Contreras
Attorney, Agent, or Firm—Connolly & Hutz

[57] ABSTRACT

A transparency mounting device includes a support member made from a non-opaque material. Adhesive is applied to one face of the support member so that a transparency may be attached thereto. The adhesive has low tack characteristics to permit the ready detachment or repositioning of the transparency. In addition, the adhesive is non-opaque so that transparency may be illuminated through the support member and adhesive.

11 Claims, 1 Drawing Sheet

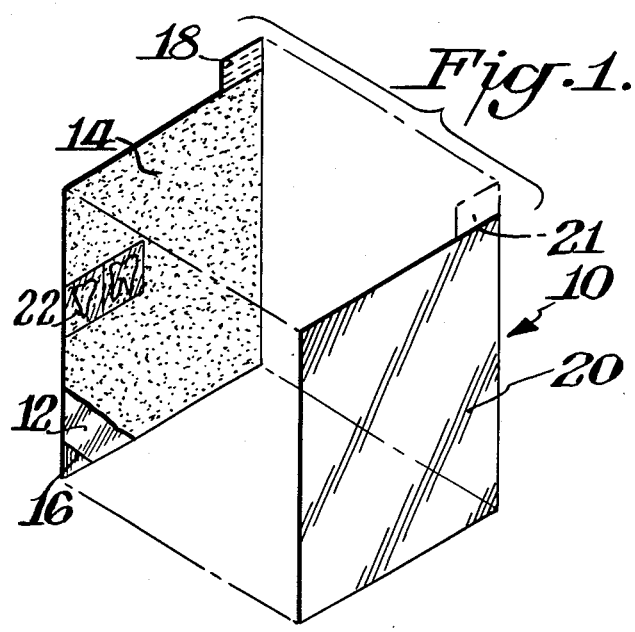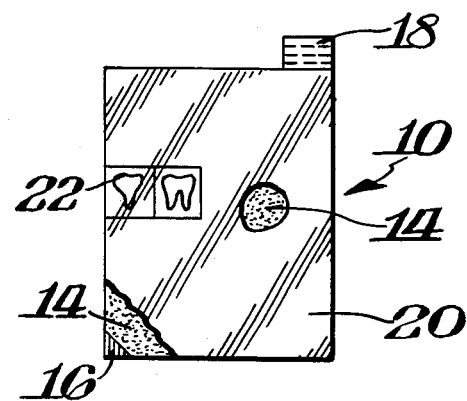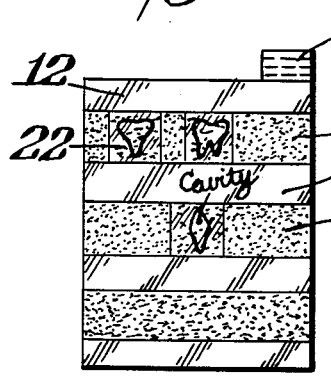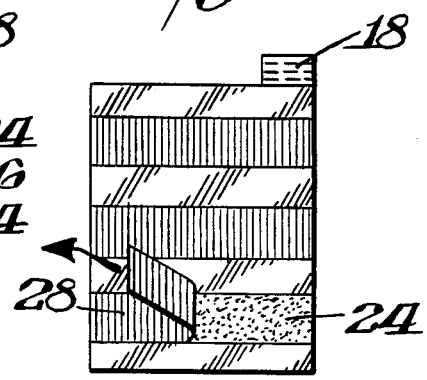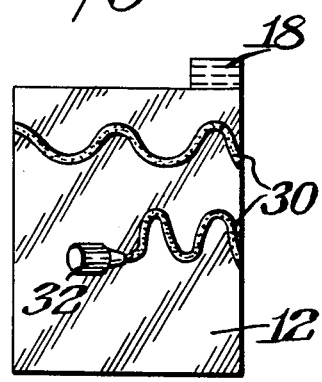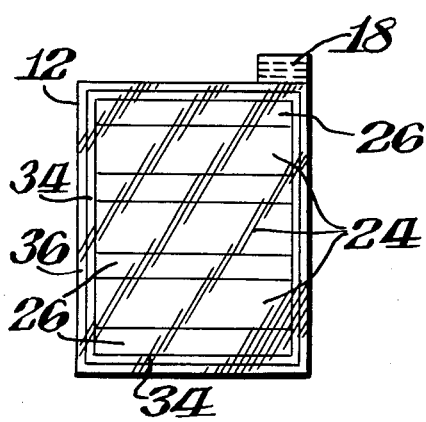

TRANSPARENCY MOUNTING DEVICE AND METHOD

BACKGROUND OF THE INVENTION

The present invention is concerned with the mounting of transparencies such as photographic films or negatives and X-ray films. Among the many considerations for devising the best system of mounting transparencies are the convenient viewing, the storage of the transparency during periods of non-use and the ability to readily retrieve a desired transparency from storage. In general, transparencies such as X-ray films, particularly dental X-rays which are relatively small, are placed in a folder which, in turn, is inserted in a drawer during storage. The individual transparencies rest at the bottom of the folder one in front of the other. This practice is particularly wasteful from a space standpoint since an appreciable thickness results at the bottom of the folder where the transparencies are with the remainder of the folder being virtually empty. A further difficulty with such storage practice is the inconvenience of readily identifying a specific transparency so that it can be conveniently retrieved for viewing.

Many attempts have been made to improve the conventional practices of viewing and storing transparencies. These practices have included the utilization of adhesive material for mounting the transparencies to a support member. In general this approach is disadvantageous since the adhesive material is applied at specific locations by the manufacturer which, in turn, dictates to the user specifically where on the support member the transparency is to be mounted. A further disadvantage is that the adhesive material itself may have high tack characteristics which would necessitate leaving the film on the support member once it has been mounted. This, in turn, would render the mounting arrangement into a single use device.

Various approaches for mounting transparencies or other devices are exemplified by U.S. Pat. Nos. 1,730,883, 2,107,738, 3,564,745, 3,997,994, 4,106,230, 4,156,978 and 4,507,166.

SUMMARY OF THE INVENTION

An object of this invention is to provide transparency mounting device and method which permits the user to mount the transparency at any desired location on a support member.

A further object of this invention is to provide such a device and method wherein the transparency may be stored while being mounted on the support sheet so as to minimize storage space by avoiding the stacking of the transparencies in an unmounted condition at the bottom of a folder.

A still further object of this invention is to provide a transparency mounting device and method wherein the user could select where an adhesive material would be applied to the support member to which the transparency would be secured.

In accordance with this invention, a support sheet made of non-opaque material is provided having exposed low tack adhesive on one face thereof. The low tack adhesive permits an individual transparency to be readily mounted in position and conveniently detached when desired. The adhesive itself is also non-opaque so that a light may shine through the support member and adhesive during viewing. If desired, a removable cover sheet may be applied to the support member with the transparencies sandwiched therebetween. Advantageously the exposed portions of the adhesive which are not utilized for mounting the transparencies may be utilized for securing the cover sheet to the support member during storage and may be utilized for securing the support member to the light source panel during viewing.

In accordance with this invention, the adhesive may be applied in a number of different manners. One form of application would be the provision of double-faced tape wherein one adhesive face would have high tack characteristics for generally permanent securement to the support member and the other face would have low tack characteristics for the detachable securement of the transparencies and removable cover sheet. In an alternative form, the adhesive may be applied to the support member by the user in situ from an adhesive dispenser. A still further alternative would be for the manufacturer to apply the adhesive over substantially the entire face of the support member.

THE DRAWINGS

FIG. 1 is a perspective view partly broken away showing a transparency mounting device in accordance with this invention;

FIG. 2 is a front elevation view of the mounting device of FIG. 1;

FIG. 3 is a front elevation view of a further mounting device in accordance with this invention during one phase of operation;

FIG. 4 is a front elevation view of the device of FIG. 3 in a different phase of operation; and FIGS. 5-6 are front elevation views of yet further mounting devices in accordance with this invention.

DETAILED DESCRIPTION

The present invention is directed to the mounting of transparencies. The term "transparency" is used in its broadest sense and refers to devices which are viewed with the aid of a light source. One intended form of transparency is photographic transparencies such as negatives. Another form is X-ray films, such as dental X-ray films. X-ray films differ from photographic transparencies, apart from end use, in that photographic transparencies generally have one emulsion side and one non-emulsion side, whereas X-ray films have two emulsion sides.

FIG. 1 shows a transparency mounting device 10 in accordance with this invention. As illustrated therein, device 10 includes a support member 12 made of any suitable non-opaque material such as translucent acetate. Support member 12 has an adhesive layer 14 applied to substantially its entire outer surface except for corner 16 as later described. In accordance with this invention, adhesive layer 14 is of low tack characteristics such as commercially available by 3M marketed under the name Post-it® note pads which may be readily secured to and readily detached from another member. Support member 12 also includes in a preferred form of this invention a tab 18 extending upwardly from its upper edge. Device 10 additionally includes a removable cover sheet 20 which has the same shape and dimensions as support member 12 except for the absence of a tab. If desired, however, cover sheet 20 may also have a tab 21.

In practice a number of individual transparencies 22 would be conveniently applied at any desired location on support member 12 by pressing the film 22 into contact with low tack adhesive 14. Where photographic transparencies are mounted, the non-emulsion side is pressed against the adhesive 14. Because support member 12 and adhesive 14 are non-opaque, the transparency 22 may be conveniently viewed by illumination through support member 12 and adhesive 14. Ideally support member 22 and adhesive 14 are as transparent as possible. Within the broad concepts of this invention, however, what is necessary is that these members be non-opaque so that light can pass therethrough.

It would be generally desirable to provide a transparency mounting device with the capability of having the user such as a dentist make notations thereon pertinent to the individual X-rays or a user making notations appropriate to a photographic transparency. In the embodiment of FIG. 1 where adhesive 14 covers substantially all of the front face of support member 12, the back face of support member 12 would be treated such as by etching so that the user could write the necessary notations on the back face of support member 12. Additionally tab 18 permits notations to be made to readily indicate information regarding the individual transparencies to facilitate retrieval of the transparencies from storage. Sets of support members 12 may be provided with the tabs 18 staggered to maximize tab visibility.

In practice after the appropriate transparencies have been mounted on support member 14 and the desired notations and indicia have been applied to support member 12 and tab 18, cover sheet 20 is mounted thereon. This is accomplished by superimposing cover sheet 20 with the front face of support member 12 and pressing cover sheet 20 against cover sheet 12 in portions where no transparency is located. In this manner utilization is made of the already available adhesive 14 to secure cover sheet 20 and support member 12 together. Where cover sheet 20 has a tab 21, the alignment of tabs 18 and 21 serve to align support member 14 and cover sheet 20. In such case tab 21 would be transparent to permit the notations on tab 18 to be visible or the notations may be made on tab 21.

The resulting unit may then be stored in a folder with the transparencies still mounted on support member 12 rather than being stacked at the bottom of a folder. When it is desired to again view the transparencies 22, cover sheet 20 is removed. This is accomplished by lifting the corner of cover sheet 20 opposite corner 16 which is free of adhesive. Cover sheet 20 would then be stripped from support member 12. Cover sheet 20 could be made of any suitable material such as the same type of acetate material used for support member 12. It is to be understood, however, that unlike support member 12 it is not necessary for cover sheet 20 to be non-opaque. Thus cover sheet 20 could be opaque, translucent or transparent. After cover sheet 20 has been removed, support member 12 is mounted for viewing by pressing the exposed portions of adhesive 14 against the light source panel.

FIG. 2 illustrates the assembly resulting from the mounting of cover sheet 20 to support member 12. This is the condition of device 10 when being stored.

FIGS. 3-4 show an alternative practice of this invention. As indicated therein, the adhesive is applied by the user himself through the use of a double coated tape 24 having a high tack coating on one side thereof and a low tack coating on the other side. A suitable tape is available from 3M under the designation Y9415 High Tack/Low Tack Double Coated Tape. The user would apply the tape with the high tack side directly in contact with support member 12 to provide a substantially permanent securement of adhesive 24 to support member 12. The low tack side would then be exposed for receiving transparencies 22 as illustrated. The advantage of applying the adhesive by means of a tape is that the user can select where the transparency is to be mounted and by forming spaced strips of adhesive 24, free areas 26 result on support member 12. The free areas 26 can be used by, for example, the dentist to make whatever notations are necessary directly on the same side of support member 12 as the X-ray films. This is more convenient than having to make the notations on the rear face as with the embodiment of FIGS. 1-2. Thus where the support member 12 is of the type made, for example, of acetate having a glossy side and a treated side, the glossy side may serve as the rear face and the treated side would serve as the mounting face.

Preferably the spaced strips of adhesive 24 are of sufficient width so that the entire transparency overlays the adhesive 24. This is desirable because the existence of a material such as the adhesive or the support member between the illuminating source and the transparency could introduce the possibility of some distortion. By having the transparency 22 completely overlaying the adhesive and the support member, any distortion would be uniform and thereby minimized so that it would have negligible effect on the viewing or interpretation of the transparency.

FIG. 4 illustrates one practice of the invention of FIG. 3 wherein the double facd tape 24 is supplied in roll or other bulk form with protective strips 28 secured to the low tack side. Individual lengths of tape and strip would be cut from the supply. Tape 24 would be pressed against support member 12 with strips 28 left thereon to protect the low tack side. Strips 28 may be removed immediately prior to the mounting of the transparencies.

In a practice of the invention where the tape 24 is not provided with protective strips, cover sheet 20 would serve to protect adhesive 24 even before the transparencies are mounted.

After transparencies 22 are applied to the low tack side of adhesive 24, portions of the low tack side of adhesive 24 would still be exposed by not being covered by transparencies. As a result, removable cover sheet 20 could be applied by pressing the cover sheet against those exposed portions of the low tack face.

FIG. 5 illustrates yet another variation of this invention wherein the user would apply a low tack adhesive 30 directly to the support member 12 in situ by means of a suitable applicator 32 containing the adhesive ingredients in flowable form. This provides the advantage of permitting the user to have greater flexibility in selecting the width of the strips of adhesive 30.

FIG. 6 illustrates yet another variation of this invention. In this embodiment a closed loop border of low tack adhesive 34 is applied on support member 12 spaced slightly from the edge of support member leaving an adhesive free peripheral area 36. Adhesive border 34 could be applied by the manufacturer or by the user from strips of tape or from an applicator. The user would then apply adhesive to spaced portions spanning the border 34 such as by adhesive tape 24 leaving adhesive free areas 26 therebetween. Areas 26 permit notations to be made on support member 12 with the transparencies mounted to adhesive 24. The function of adhesive border 34 is to permit cover sheet 20 to be mounted so as to provide a seal completely around the transparencies to prevent air or dust from entering. The adhesive free area 36 facilitates removal of cover sheet 20. Although border 34 is illustrated uniformly spaced from the edge of support member 12, the spacing may be at only one location to facilitate removal of sheet 20.

Various materials can be used in the practice of this invention. For example, as previously indicated, both support member 12 and cover sheet 20 may be of commercially available acetate sheets having an etched side and a non-etched side. The adhesive itself should be selected so as to be harmless to the components of the mounting device and particularly to be harmless to the transparencies. Any suitable size sheets could be used for practicing the invention. A support sheet 8 inches by 10 inches would be particularly convenient since it would lend itself to standard folders for filing purposes. Although support member 12 should be as transparent as possible, it is not critical whether the support member 12 is transparent or translucent but it must be non-opaque to permit light to pass therethrough.

As can be appreciated, in practicing the invention the transparencies may be readily mounted at various portions to the support member. The low tack surface permits not only a quick mounting but also permits convenient rearrangement or remounting should such be necessary. Because device 10 would be stored vertically in a folder, each device 10 would contain a number of transparencies which have an overall thickness of only one transparency in contrast to the conventional practice of stacking a number of transparencies in front of each other. The invention thereby minimizes the storage area necessary for the transparencies This could be particularly important when it becomes necessary to store transparencies over a long period of time. Moreover, the use of indicia such as tab 18 or tab 21 facilitates the ready retrieval of particular transparencies. The ability to mount the transparencies in such a manner as to also permit written comments to be made adjacent the transparencies further enhances the invention. Particularly noteworthy is the ability to use exposed portions of the low tack adhesive for mounting a cover sheet during storage or for mounting the support member to the light source panel during viewing.

What is claimed is:

1. A transparency mounting device, in combination therewith, a support member made of light transmitting material, said support member having a front face and a rear face, an adhesive layer over substantially the entire surface of said front face, said adhesive layer being light transmitting to permit a light to shine through said support member and said adhesive layer, said adhesive layer presenting a low tack surface remote from said support member to permit transparencies to be mounted on said support member and to be readily detached therefrom, a plurality of transparencies secured to said adhesive layer, portions of said adhesive layer including the edges at the periphery of said support member being not covered by any transparency and thereby exposed, a completely removeable cover sheet of the same size and shape as said support member being secured to said support member by contacting said exposed portions of said adhesive layer; and said cover sheet being disposed over and in contact with said transparencies and completely shielding said transparencies to seal and protect said transparencies during storage thereof.

2. The device of claim 1 wherein each of said support member and said cover sheet includes a tab of the same size and shape for aligning said cover sheet with said support member.

3. The device of claim 1 wherein said adhesive layer strips comprise double coated tape having a high tack side and a low tack side, and said high tack side being directly in contact with said support member.

4. The device of claim 1 wherein one corner of said support member is free of said adhesive layer to provide a non-adhesive portion which may be used for separating said cover sheet from said support member.

5. A transparency mounting device, in combination therewith, a support member made of light transmitting material, said support member having a front face and a rear face, a plurality of adhesive strips on said front face, said adhesive strips being light transmitting to permit a light to shine through said support member and said adhesive strips, said adhesive strips presenting a low tack surface remote from said support member to permit transparencies to be mounted on said support member and to be readily detached therefrom, a plurality of X-ray film transparencies secured to said adhesive strips, said transparencies not covering all portions of said adhesive strips and thereby leaving exposed portions of said adhesive strips, a completely removeable cover shet of the same size and shape as said support member being secured to said support member by contacting said exposed portions said adhesive strips, and said cover sheet being disposed over and in contact with said transparencies and completely shielding said transparencies to protect said transparencies during storage thereof.

6. A method of mounting and viewing and storing a transparency comprising providing a support member made of a light transmitting material having a light transmitting adhesive layer on at least a portion of the front face of the support member with a cover sheet secured to the adhesive layer, removing the cover sheet from the support member, mounting an X-ray film transparency to the support member by pressing the transparency against the adhesive layer with the transparency not completely covering the adhesive layer so that portions of the adhesive layer are exposed, mounting the support member to a viewing screen by pressing the exposed portions of the adhesive layer against the viewing screen, shining light through the transparency to view the transparency, removing the support member and transparency from the viewing screen, mounting the cover sheet to the support member while the transparency is still adhered to the support member by pressing the cover sheet against the exposed portions of the adhesive layer, completely shielding the transparency by the transparency being sandwiched between the support member and the cover sheet, and storing the transparency in its sandwiched condition.

7. The method of claim 6 wherein the layer of adhesive is provided by means of a double coated tape having a high tack side and a low tack side, applying the high tack side directly to the support member, and applying the double coated tape to the support member in spaced strips to leave areas between the strips in which information may be written.

8. The method of claim 6 wherein the adhesive layer is applied in situ from an applicator.

9. The method of claim 6 wherein the adhesive layer is applied in the form of spaced parallel adhesive strips.

10. The method of claim 6 including the steps of retrieving the support member with the attached transparency and cover sheet from storage, removing the cover sheet from the support member, mounting a further transparency to the adhesive layer, viewing the transparencies, and securing the cover sheet to the support member in a position which shields all transparencies mounted on the support member.

11. The method of claim 10 wherein the transparency is repositioned on the adhesive layer before the further transparency is mounted thereto.

* * * * *